(12) United States Patent
Moon et al.

(10) Patent No.: US 7,257,298 B2
(45) Date of Patent: Aug. 14, 2007

(54) OPTICAL FIBER CABLE

(75) Inventors: Seung-Hyun Moon, Daegu (KR); Kyung-Tae Park, Gumi-si (KR); Hoon-Soo Park, Gwangmyeong-si (KR); Hee-Goo Kang, Andong-si (KR); Young-Su Jung, Gumi-si (KR); Eun-Song Um, Gumi-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 51 days.

(21) Appl. No.: 10/963,942

(22) Filed: Oct. 13, 2004

(65) Prior Publication Data

US 2005/0265674 A1 Dec. 1, 2005

(30) Foreign Application Priority Data

May 31, 2004 (KR) .................. 10-2004-0039222

(51) Int. Cl.
*G02B 6/44* (2006.01)

(52) U.S. Cl. .................... 385/112; 385/113

(58) Field of Classification Search ........... 385/100, 385/112–114, 115–117
See application file for complete search history.

(56) References Cited

U.S. PATENT DOCUMENTS

| 5,390,273 A | * | 2/1995 | Rahman et al. | 385/112 |
| 5,630,003 A | * | 5/1997 | Arroyo | 385/113 |
| 5,684,904 A | * | 11/1997 | Bringuier et al. | 385/109 |
| 6,278,826 B1 | * | 8/2001 | Sheu | 385/109 |

FOREIGN PATENT DOCUMENTS

| DE | 3832609 C1 | | 1/1990 |
| EP | 1273947 A1 | | 1/2003 |
| GB | 1064231 A | * | 4/1967 |
| JP | 06-180412 | | 6/1994 |

* cited by examiner

*Primary Examiner*—Rodney Bovernick
*Assistant Examiner*—Omar Rojas
(74) *Attorney, Agent, or Firm*—Cha & Reiter, LLC

(57) ABSTRACT

An optical fiber cable includes a plurality of loose tubes and an outer jacket for binding the loose tubes is disclosed. Each of the plurality of loose tube includes one or more optical fibers; an inner jacket for binding the optical fibers; and an antistatic fluid applied between the optical fibers to prevent or reduce the generation of static electricity between the optical fibers.

6 Claims, 5 Drawing Sheets

OPTICAL FIBER CABLE

CLAIM OF PRIORITY

This application claims priority to an application entitled "Optical Fiber Cable," filed with the Korean Intellectual Property Office on May 31, 2004 and assigned Serial No. 2004-39222, the contents of which are hereby incorporated by reference.

BACKGROUND OF THE INVENTION

1. Field of the Invention

The present invention relates to an optical fiber cable, and more particularly to an optical fiber cable having a plurality of tubes.

2. Description of the Related Art

Optical fibers are commonly used in optical communication networks due to their advantages, such as high bandwidth capacity and small size. However, conventional optical fibers are extremely delicate and detrimentally affected by physical and environmental conditions, such as tensile stresses. In view of such physical limitations of optical fibers, efforts have been made to use a cable design that integrates a bundle of ducts each containing at least one optical fiber.

An optical fiber cable generally includes a plurality of strength members for improving the tensile strength of optical fibers and a plurality of water blocking members for preventing the intrusion of moisture into the optical fibers. Such optical fiber cables may have a loose tube structure with optical fibers contained in a plurality of tubes or a ribbon cable structure with a plurality of ribbon optical fibers.

In U.S. Pat. No. 5,630,003 of Candido J. Arroyo et al., a loose tube optical fiber cable is disclosed. The cable of Arroyo et al. has a plurality of loose tubes each containing a plurality of optical fibers. Each loose tube incorporates a water blocking yarn or tape, instead of a gel-type filler, to prevent the water intrusion into the tube.

Because the loose tube optical fiber cable of Arroyo et al. does not use a gel-type water blocking member, it eliminates the need to wash the optical fibers stained with gel and thereby expedites the removal of an outer jacket.

However, in conventional cables described above, serious static electricity may be caused between optical fibers contained in a tube. The static electricity acts as a repulsive force between the optical fibers and lowers efficiency in a process of applying or removing the outer jacket.

SUMMARY OF THE INVENTION

One aspect of the present invention is to provide a non-gel filled optical fiber cable capable of preventing the generation of static electricity between optical fibers included therein.

One embodiment of the present invention is directed to an optical fiber cable having a plurality of tubes and an outer jacket for binding the tubes. Each tube includes one or more optical fibers, an inner jacket for binding the optical fibers, and an antistatic fluid applied between the optical fibers to prevent the generation of static electricity between the optical fibers.

BRIEF DESCRIPTION OF THE DRAWINGS

The above and other aspects, features and embodiments of the present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein will be omitted when it may obscure the subject matter of the present invention.

Figure 1:
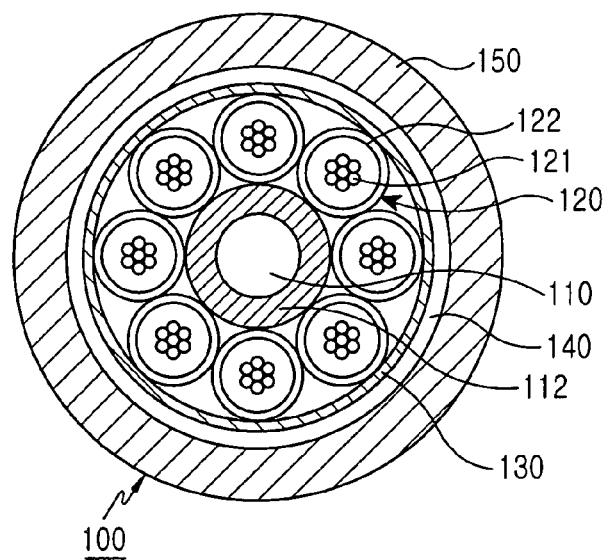
FIG. 1 is a cross-sectional view of an optical fiber cable including a plurality of tubes according to a first embodiment of the present invention.

FIG. 1 is a cross-sectional view of an optical fiber cable having a plurality of loose tubes according to the first embodiment of the present invention. As shown, the optical fiber cable 100 includes a central strength member 110, a plurality of loose tubes 120, a first water blocking tape 130, an outer strength member 140 and an outer jacket 150.

The central strength member 110 located at the core of the cable 100 offers a tensile strength to the optical fiber cable 100. The central strength member 110 can be made of FRP (fiberglass reinforced plastic). To improve the tensile strength, a coating layer 112 is formed on the outer periphery of the central strength member 110. The coating layer 112 is made of a polymer compound, such as PVC (polyvinyl chloride) or PB (polyethylene).

Figure 2:
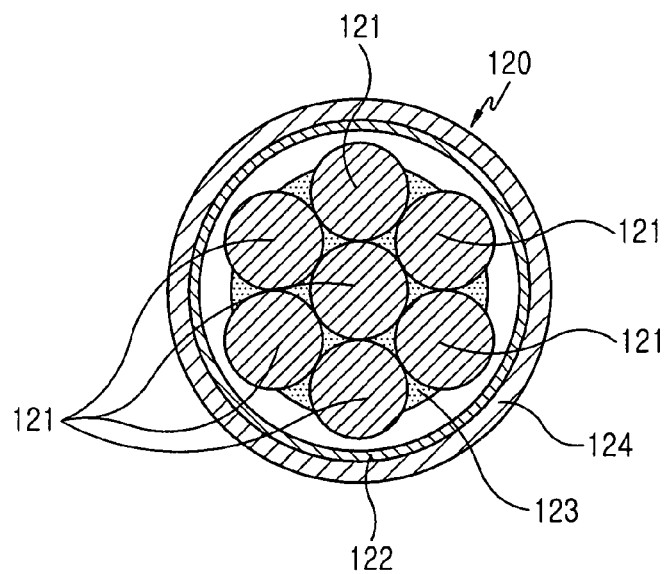
FIG. 2 is a view showing a loose tube in FIG. 1.

FIG. 2 shows a loose tube 120 in FIG. 1. Referring to FIG. 2, each loose tube 120 includes one or more optical fibers 121, an antistatic fluid 123 filled in voids between the optical fibers 121 to prevent the generation of static electricity between the fibers 121, an inner jacket 124 for binding the optical fibers 121 and a second water blocking tape 122 for preventing the intrusion of water into the optical fibers 121.

The second water blocking tape 122 surrounding around the loose tubes 120 prevents water intrusion into the tube 120 and provides a measure of impact prevention. The second water blocking tape 122, which replaces a jelly compound, facilitates a process of stripping the optical fiber cable 100. The antistatic fluid 123 may also include, e.g., a thixotropic compound, that is applied between the optical fibers 121. This prevents or reduces the generation of a repulsive force caused by the static electricity between the optical fibers 121.

The first water blocking tape 130 surrounds around the plurality of loose tubes 120 to prevent the water intrusion into the tubes 120.

The outer strength member 140 surrounds the first water blocking tape 130 and improves the tensile strength of the optical fiber cable 100. The outer strength member 140 can be made of, e.g., glass yarn or strength yarn.

The outer jacket 150 covers the outer surface of the optical fiber cable 100. The outer jacket 150 may include a polymer compound, such as PVC (polyvinyl chloride), PE (polyethylene), hytrel, nylon or polypropylene. It may be formed, e.g., by extrusion coating. Also, a ripcord can be provided under the outer jacket 150 to facilitate the removal of the outer jacket 150.

Figure 3:
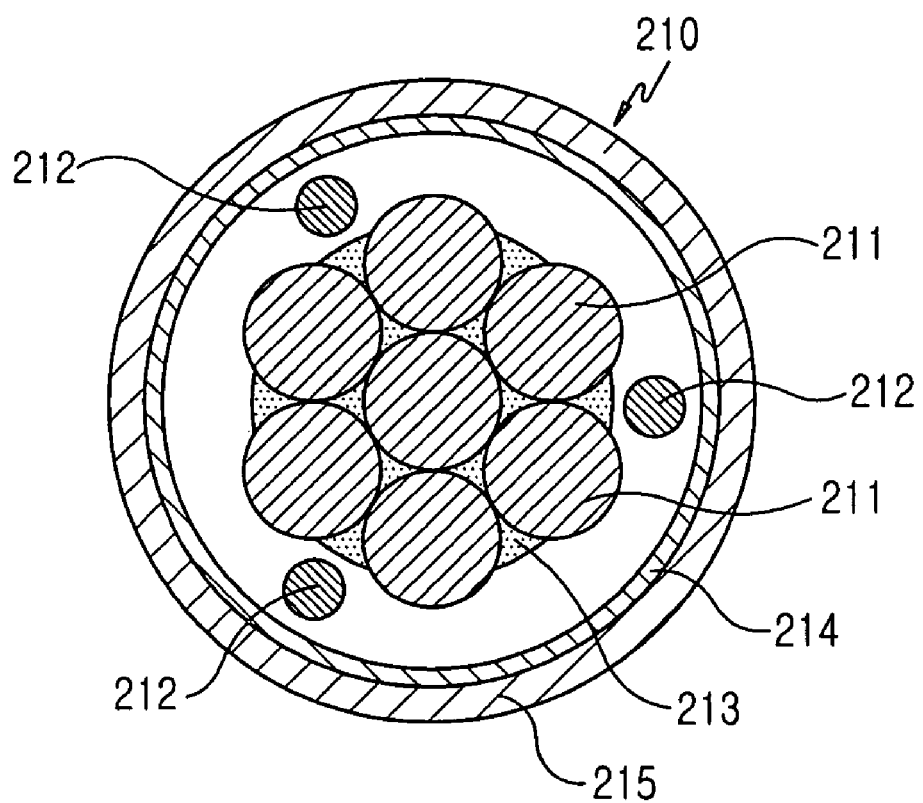
FIG. 3 is a view showing a loose tube including a plurality of water blocking yarns according to a second embodiment of the present invention.

FIG. 3 shows a loose tube incorporating a plurality of water blocking yarns therein according to the second embodiment of the present invention. As shown in FIG. 3, each loose tube includes one or more optical fibers 211, an inner jacket 215 for binding the optical fibers 211, an antistatic fluid 213, water blocking yarns 121 and a water blocking tape 214. The loose tube 210 is applicable to an optical fiber cable (not shown) having an outer jacket (not shown) and a central strength member (not shown) for offering a tensile strength to the cable.

The inner jacket 215 binds up the optical fibers 211. The antistatic fluid 213 filled in voids and interstices between the optical fibers 211 effectively prevents or reduces the generation of static electricity between the fibers 211.

The water blocking yarns 212 are interposed between the inner jacket 215 and the optical fibers 211 to block the flow of water into the optical fibers 211 and reduce impacts on the optical fibers 211.

Figure 4:
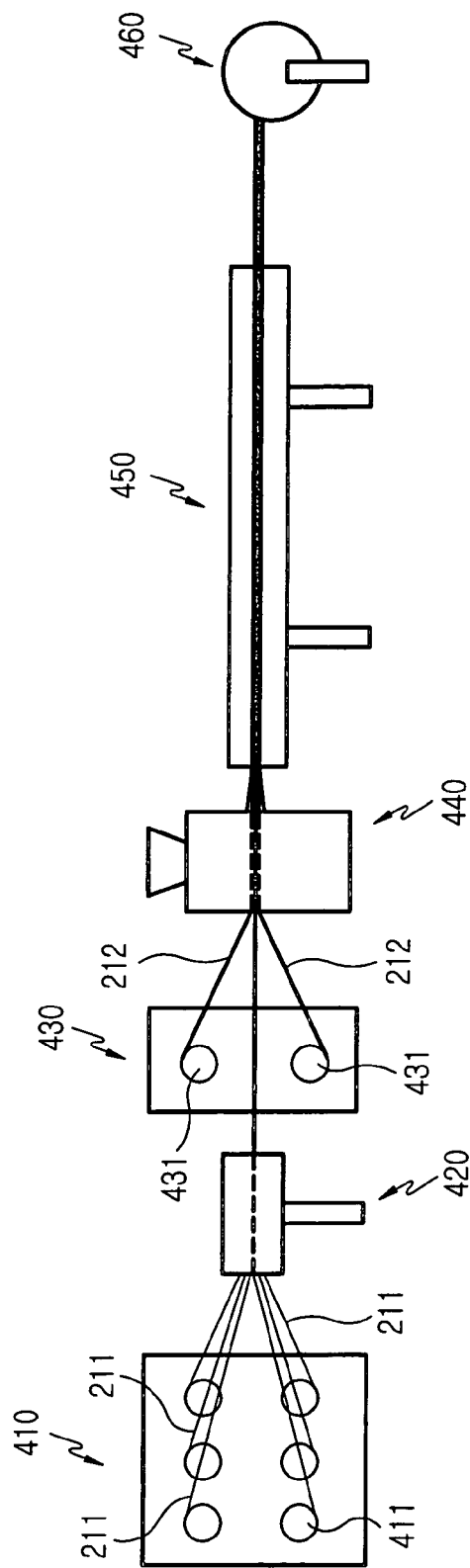
FIG. 4 is a view schematically showing an apparatus for manufacturing the loose tube in FIG. 3.

FIG. 4 schematically shows the structure of an apparatus for manufacturing the loose tube 210 in FIG. 3. Referring to FIG. 4, the loose tube manufacturing apparatus includes a first pay-off 410, a first coating unit 420 for applying the antistatic fluid 213 to fill the voids between the optical fibers 211, a second pay-off 430, a second coating unit 440, a cooler 450 and a winding unit 460.

The first pay-off 410 includes a plurality of bobbins 411 around which a plurality of optical fibers 211 is wound. The first pay-off 410 maintains a tensile force applied to each optical fiber at a constant level during the manufacture of the loose tube 210.

The first coating unit 420 applies the antistatic fluid 213 to the outer periphery of each optical fiber 211. The antistatic fluid 213 may also include a thixotropic compound and an antistatic agent.

The second pay-off 430 includes a plurality of bobbins 431 around which a plurality of water blocking yarns 212 incorporated in the loose tube 210 is wound. The second pay-off 420 maintains a tensile force applied to each water blocking yarn 212 at a constant level during the manufacture of the loose tube 210.

The second coating unit 440 coats the optical fibers 211 and the water blocking yarns 212 with a polymer compound, such as PVC (polyvinyl chloride), PE (polyethylene), hytrel, nylon or polypropylene, to form the inner jacket 215 and water blocking tape 214 of the loose tube 210. The cooler 450 cools the coated inner jacket 215 of the loose tube 210. The winding unit 460 winds the loose tube 210 on a spool.

Figure 5:
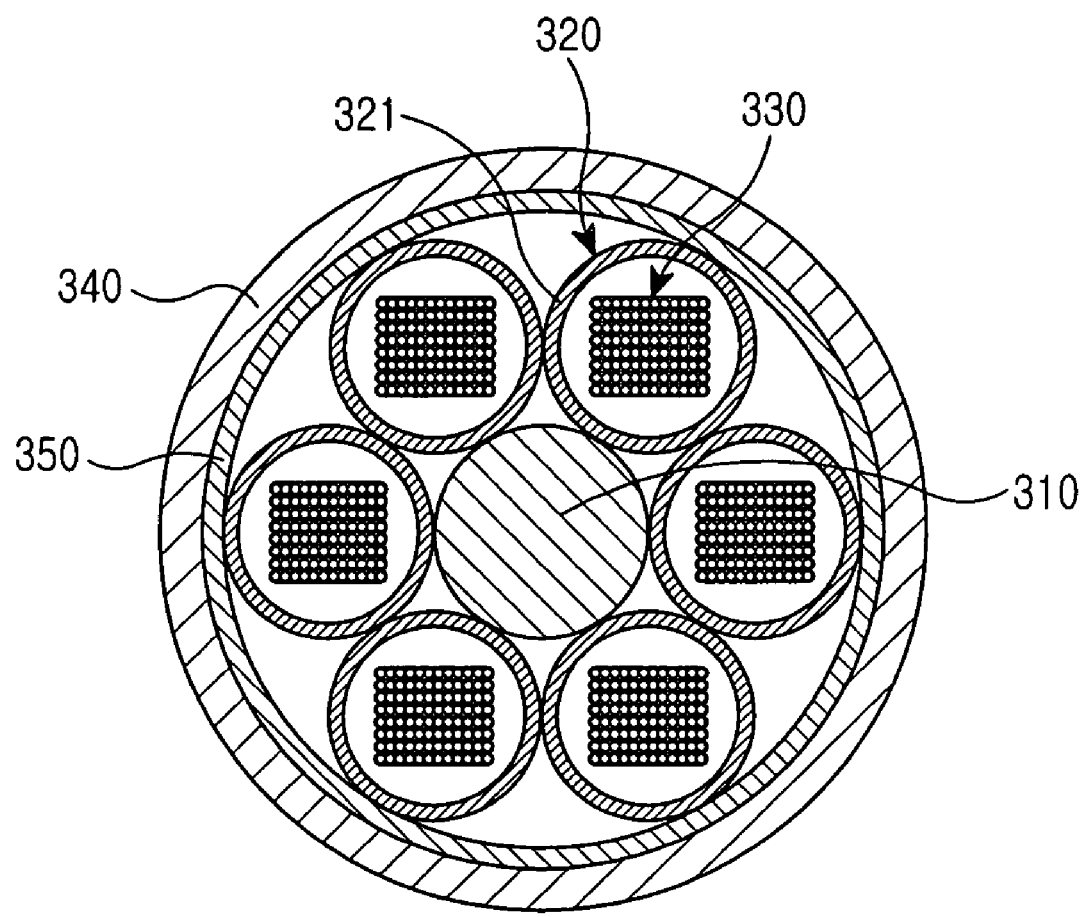
FIG. 5 is a cross-sectional view of an optical fiber cable having tubes each containing a bundle of ribbon optical fibers according to a third embodiment of the present invention.
Figure 6:
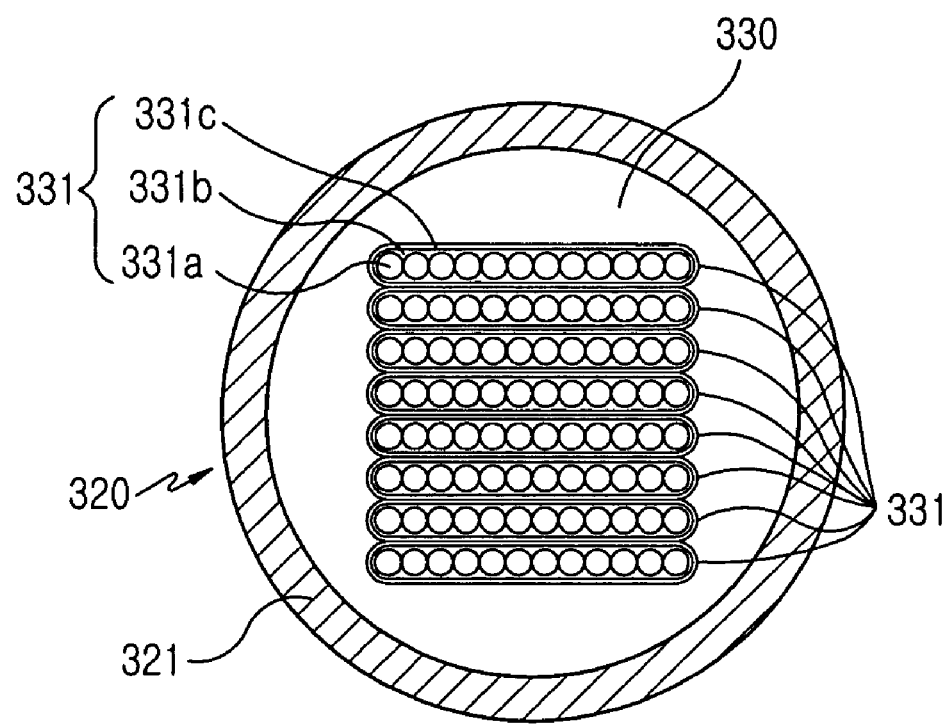
FIG. 6 is a view showing a tube containing a bundle of ribbon optical fibers in FIG. 5.

FIG. 5 is a cross-sectional view of an optical fiber cable having tubes each containing a bundle of ribbon optical fibers according to the third embodiment of the present invention. FIG. 6 is a view showing a tube containing a bundle of ribbon optical fibers in FIG. 5. Referring to FIGS. 5 and 6, the optical fiber cable includes a plurality of tubes 320, an outer jacket 340 for binding the tubes 320, a central strength member 310 and a water blocking tape 350.

Each tube 320 includes a bundle of ribbon optical fibers 330 and an inner jacket 321 for binding the bundle of ribbon optical fibers 330.

The bundle of ribbon optical fibers 330 includes a plurality of stacked ribbon optical fibers 331 and an antistatic fluid 331c filled between the ribbon optical fibers 331 to prevent or reduce the generation of an electrostatic force between the fibers 331. The antistatic fluid 331c may also include a thixotropic compound.

Each ribbon optical fiber 331 includes a plurality of optical fibers 331a, a UV hardener 331b applied around the optical fibers 331a and an antistatic fluid 331c coated around the UV hardener 331b. The optical fibers 331 are hardened when exposed to the UV light in a certain period of time after being coated with the UV hardener 331b.

The central strength member 310 located at the core of the optical fiber cable offers a tensile strength to the cable. The water blocking tape 350 binds the tubes 320 and the central strength member 310 and prevents the intrusion of water into the cable.

The optical fiber cables provided by various embodiments of the present invention can prevent or reduce the generation of static electricity between the optical fibers due to the antistatic fluid filled between the optical fibers. For example, such optical fiber cables can prevent or reduce the static electricity between the optical fibers, without using a gel-type water blocking means, thereby facilitating the installation and the cable connection.

Although various embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. An optical fiber cable comprising:
   a plurality of loose tubes; and
   an outer jacket for binding the loose tubes,
   wherein each loose tube includes one or more optical fibers; an inner jacket for binding the optical fibers; an antistatic fluid applied between the optical fibers; and a water blocking tape that is provided between the optical fibers and the inner jacket and that is attached to the inner jacket, and
   wherein the antistatic fluid is separated from the water blocking tape and is free of contact with the water blocking tape.

2. The optical fiber cable according to claim 1, wherein said antistatic fluid comprises a thixotropic compound.

3. The optical fiber cable according to claim 1, wherein said antistatic fluid is applied around the periphery of each optical fiber along the longitudinal axis of the optical fiber.

4. The optical fiber cable according to claim 1, further comprising:
   a central strength member located at the center of the optical fiber cable to offer a tensile strength; another water blocking tape for binding the plurality of loose tubes and preventing the intrusion of water into the loose tubes; and an outer strength member surrounding the first water blocking tape to offer the tensile strength of the optical fiber cable, the outer strength member being surrounded by the outer jacket.

5. The optical fiber cable according to claim 4, wherein said central strength member includes on the outer periphery thereof a layer coated with a polymer compound.

6. The optical fiber cable according to claim 1, wherein each loose tube further includes: water blocking yarns interposed between the inner jacket and the optical fibers to block the intrusion of water into the optical fibers.

* * * * *